UNITED STATES PATENT OFFICE.

JOHN D. PRESTON, OF TAYLORVILLE, ASSIGNOR OF ONE-HALF TO JOHN T. ROSS, OF LITCHFIELD, ILLINOIS.

COMPOSITION OF MATTER FOR PLASTER.

SPECIFICATION forming part of Letters Patent No. 519,548, dated May 8, 1894.

Application filed August 16, 1893. Serial No. 483,310. (No specimens.)

*To all whom it may concern:*

Be it known that I, JOHN D. PRESTON, a citizen of the United States, residing at Taylorville, in the county of Christian and the State of Illinois, have invented a new and useful Composition of Matter to be Used for Plastering Purposes, of which the following is a specification.

My composition consists of the following ingredients combined in the proportion stated, viz: calcined gypsum, four hundred and fifty-five pounds; ground lime rock, one hundred and forty pounds; sand, seven hundred pounds; calcined or roasted clay, thirty-five pounds; hair, eight pounds.

As a retarder and for the purpose of adding strength and toughness to the composition the following ingredients are mixed with the same, viz: linseed oil, one pint; sal soda, one-fourth of a pound; sugar, two pounds; lime, two pounds; shipstuff, three pounds. Add water and boil for twenty minutes and mix with pulverized clay, thirty-two pounds. Dry by evaporation and grind to a powder. All the ingredients are then to be thoroughly commingled in a plaster mixing machine.

In using the above mixture or composition it should be mixed with a sufficient quantity of water to make it of the proper consistency to work under a trowel, and it is then to be put on as ordinary plaster.

By using the above composition of matter, I claim the following advantages over any composition used for like purposes known to me. First. It is a quicker dryer. Second. A superior hardness. Third. An easier worker. Fourth. Work may be completed in one half the time ordinarily required for plastering material. Fifth. If allowed one hour to stand this composition will withstand frost and may be used in cold weather. Sixth. The use of lime ground from lime rock instead of air slaked lime, thus retaining the life of the lime.

What I claim, and desire by Letters Patent to secure, is—

The above named composition of matter for plaster consisting of calcined gypsum, sand, ground lime rock, calcined clay, shipstuff, sal soda, sugar, linseed oil and hair, in about the proportions herein before set forth.

JOHN D. PRESTON.

Witnesses:
C. H. WOODWARD,
J. H. ATTERBURY.